US012620679B2

(12) United States Patent
Matsui

(10) Patent No.: US 12,620,679 B2
(45) Date of Patent: May 5, 2026

(54) BATTERY INCLUDING ELECTRODE TAB INCLUDING A WRINKLE

(71) Applicant: Prime Planet Energy & Solutions, Inc., Tokyo (JP)

(72) Inventor: Yu Matsui, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 686 days.

(21) Appl. No.: 17/893,072

(22) Filed: Aug. 22, 2022

(65) Prior Publication Data

US 2023/0068956 A1      Mar. 2, 2023

(30) Foreign Application Priority Data

Aug. 27, 2021      (JP) .................................. 2021-138687

(51) Int. Cl.
H01M 50/533      (2021.01)
H01M 4/04      (2006.01)
H01M 50/536      (2021.01)

(52) U.S. Cl.
CPC ....... H01M 50/533 (2021.01); H01M 4/0435 (2013.01); H01M 50/536 (2021.01)

(58) Field of Classification Search
CPC . H01M 50/533; H01M 50/536; H01M 4/0435
See application file for complete search history.

(56) References Cited

U.S. PATENT DOCUMENTS

| 8,956,754 B2 | 2/2015 | Kim | |
| 2010/0167123 A1 | 7/2010 | Kim | |
| 2017/0077480 A1* | 3/2017 | Hwang | ............... H01M 50/533 |
| 2020/0373546 A1* | 11/2020 | Li | ....................... H01M 50/534 |

FOREIGN PATENT DOCUMENTS

| CN | 101964399 A | 2/2011 |
| CN | 212931393 U | 4/2021 |
| EP | 3142171 A1 | 3/2017 |
| JP | S59004171 U | 1/1984 |
| JP | 2000277155 A | 10/2000 |
| JP | 2002289167 A | 10/2002 |
| JP | 2007265874 A | 10/2007 |
| JP | 2011054319 A | 3/2011 |
| JP | 2018147832 A | 9/2018 |
| KR | 10-2004-0022006 A | 3/2004 |
| KR | 10201700094827 A | 8/2017 |
| WO | WO-2022185464 A1 * | 9/2022 |

OTHER PUBLICATIONS

EPO machine generated English translation of WO-2022185464-A1 (Year: 2022).*

* cited by examiner

*Primary Examiner* — Kimberly Wyluda

(74) *Attorney, Agent, or Firm* — HAUPTMAN HAM, LLP

(57)      ABSTRACT

The battery disclosed herein includes: a positive electrode plate including a positive electrode substrate and a positive electrode active material layer disposed on the positive electrode substrate; and a negative electrode plate including a negative electrode substrate and a negative electrode active material layer disposed on the negative electrode substrate. At least one of the positive electrode plate or the negative electrode plate has multiple electrode tabs protruding outward from a region of the associated electrode substrate where the associated electrode active material layer is not disposed. The electrode tabs each have an arc-shaped wrinkle.

10 Claims, 8 Drawing Sheets

BATTERY INCLUDING ELECTRODE TAB INCLUDING A WRINKLE

CROSS REFERENCE TO RELATED APPLICATIONS

The present application is based upon and claims the benefit of priority from Japanese patent application No. 2021-138687 filed on Aug. 27, 2021, and the entire disclosure of which is incorporated herein in its entirety by reference.

BACKGROUND

The disclosure relates to a battery. The disclosure further relates to a method of manufacturing an electrode plate and a method of manufacturing a battery.

Batteries such as lithium-ion secondary batteries each include an electrode assembly where a positive electrode plate and a negative electrode plate face each other via a separator, for example. Hereafter, these positive and negative electrode plates are collectively referred to as an "electrode plate." This electrode plate includes: an electrode active material layer forming region where an electrode active material layer containing an electrode active material is formed on an electrode substrate which is a foil-like metal member; and an electrode substrate exposing region where the electrode active material layer is not formed and the electrode substrate is exposed, for example. U.S. Pat. No. 8,956,754 discloses an electrode plate where multiple wrinkles are formed extending from the boundary between the electrode active material layer forming region and the electrode substrate exposing region.

The electrode assembly has electrode tab groups where multiple electrode tabs extending outward from the electrode substrate exposing region are stacked at both ends in the long side direction. Such electrode tab groups are connected to electroconductive members such as electrode collecting members. The electrode collecting members are then connected to the electrode terminals. Accordingly, the wound electrode assembly in the battery case and the electrode terminals outside the battery case communicate with each other.

SUMMARY

However, in such an electrode tab group, if multiple electrode tabs are not stacked in a flat state, so that the thickness of the electrode tab group becomes uneven, the electrode tabs may not be stably welded when connecting to the electroconductive member of the electrode collecting member or the like. For example, if the electrode tabs are stacked with their tips bent, the portions with the bend may be thicker, and the flat portions may be thinner. It was found that this may inhibit stable bonding with the electrode collecting member and the like.

The disclosure was made to solve the above problems and to provide a battery in which bending of each electrode tab is reduced and the thickness of the electrode tab group is made uniform and stably bonded to the electrode collecting member.

The battery disclosed herein includes: a positive electrode plate including a positive electrode substrate and a positive electrode active material layer disposed on the positive electrode substrate; and a negative electrode plate including a negative electrode substrate and a negative electrode active material layer disposed on the negative electrode substrate.

At least one of the positive electrode plate or the negative electrode plate has multiple electrode tabs protruding outward from a region of the associated electrode substrate where the associated electrode active material layer is not f disposed. The electrode tabs each have an arc-shaped wrinkle.

The each of electrode tabs have the arc-shaped wrinkle as described above suitably reduce bending of the electrode tabs at their tips. Accordingly, a battery where the thickness of the electrode tab group is unified and the electrode tab group and the electrode collecting member are stably bonded can be provided.

In an aspect of the battery disclosed herein, the electrode tabs are bonded to an electrode collecting member with being stacked. With this configuration, the electrode tabs are stacked with the bending thereof reduced and are bonded to the electrode collecting member. Accordingly, a battery where the electrode tab group and the electrode collecting member are stably bonded to each other can be provided.

In an aspect of the battery disclosed herein, the arc-shaped wrinkle is convex toward a tip of a protruding direction of each of the electrode tabs. Further, in another aspect, the arc-shaped wrinkle has a shape asymmetrical with respect to a width direction orthogonal to the protruding direction of the electrode tab. With this configuration, bending of the electrode tabs at their tips can be more suitably reduced. This allows the electrode tab group with the uniform thickness where multiple electrode tabs are stacked and the electrode collecting member to be bonded to each other. Accordingly, a highly reliable battery where the electrode tab group and the electrode collecting member are stably bonded to each other can be provided.

In an aspect of the battery disclosed herein, the electrode tabs each have multiple linear wrinkles besides the arc-shaped wrinkle. The linear wrinkles formed allow improvement in strength of the electrode tabs and suitable reduction in breakage of the electrode tabs. Accordingly, a bonding portion can be stably formed when the electrode tab group is bonded to the electrode collecting member, thereby providing a highly reliable battery.

In an aspect of the battery disclosed herein, the arc-shaped wrinkle and the linear wrinkles do not intersect. With this configuration, a bonding region between the electrode tab group and the electrode collecting member can be suitably secured, which enables stable bonding.

In an aspect of the battery disclosed herein, a portion of each of the electrode tabs bonded to the electrode collecting member has the arc-shaped wrinkle. The region where the arc-shaped wrinkle is formed becomes a relatively hard region. Thus, since the bonding portion has the arc-shaped wrinkle, so the bonding strength can be ensured.

In an aspect of the battery disclosed herein, the electrode tabs having different lengths in a protruding direction are bonded to the electrode collecting member with being stacked. With this configuration, when multiple electrode tabs are stacked, the tips thereof are easily aligned. Accordingly, the electrode tab group and the electrode collecting member are more suitably bonded to each other.

In an aspect of the battery disclosed herein, lengths of the electrode tabs having different lengths in the protruding direction, from bases to apexes of the arc-shaped wrinkles are substantially the same. With this configuration, even if the lengths of the electrode tabs in the protruding direction differ from each other, the technology disclosed herein can be appropriately exhibited.

In an aspect of the battery disclosed herein, the electrode tabs are bonded to the electrode collecting member with being stacked, and center portions of the electrode tabs in the width direction are convexly curved toward the electrode collecting member. With this configuration, breakage of the electrode tabs at the time when the electrode tab group and the electrode collecting member are bonded to each other can be reduced. Accordingly, the electrode tab group can be bonded to the electrode collecting member more suitably.

Another aspect of the technology disclosed herein is directed to a method of manufacturing an electrode plate. The method of manufacturing an electrode plate disclosed herein is a method of manufacturing an electrode plate including an electrode substrate and an electrode active material layer formed on the electrode substrate. The method includes: providing an electrode precursor including an electrode active material layer forming region where the electrode active material layer is formed on the electrode substrate, and an electrode substrate exposing region where the electrode active material layer is not formed and the electrode substrate is exposed; producing multiple electrode tabs protruding outward from the electrode substrate exposing region by processing the electrode substrate exposing region; and forming arc-shaped wrinkles in the respective electrode tabs by using a roll.

According to the method of manufacturing an electrode plate, the electrode plate having the above-described characteristics can be manufactured suitably.

Another aspect of the technology disclosed herein is directed to a method of manufacturing a battery. The method of manufacturing a battery disclosed herein is a method of manufacturing a battery including an electrode assembly where a pair of electrode plates face each other via a separator. The method includes manufacturing at least one of the electrode plates in pair by using the above-mentioned method of manufacturing an electrode plate. According to the method of manufacturing a battery, the battery having the above-described characteristics can be manufactured suitably.

DETAILED DESCRIPTION

Some preferred embodiments of the technology disclosed herein will be described below with reference to the accompanying drawings. The matters necessary for executing the disclosure (e.g., the commonly used configuration and manufacturing processes of the battery that do not characterize the disclosure), except for matters specifically herein referred to can be grasped as design matters of those skilled in the art based on the related art in the preset field. The disclosure can be executed based on the contents disclosed herein and the technical knowledge in the present field. The expression "A to B" indicating herein a range means A or more to B or less, and also encompasses the meaning of "preferably more than A" and "preferably less than B."

The "battery" herein is a term that indicates all electricity storage devices capable of extracting electric energy, and is a concept that encompasses primary batteries and secondary batteries. The "secondary battery" herein is a term that indicates all electricity storage devices that can be repeatedly charged and discharged, and is a concept that encompasses so-called secondary batteries (chemical batteries) such as a lithium ion secondary battery and a nickel hydrogen battery and capacitors (physical batteries) such as an electric double layer capacitor.

Battery 100

Figure 1:
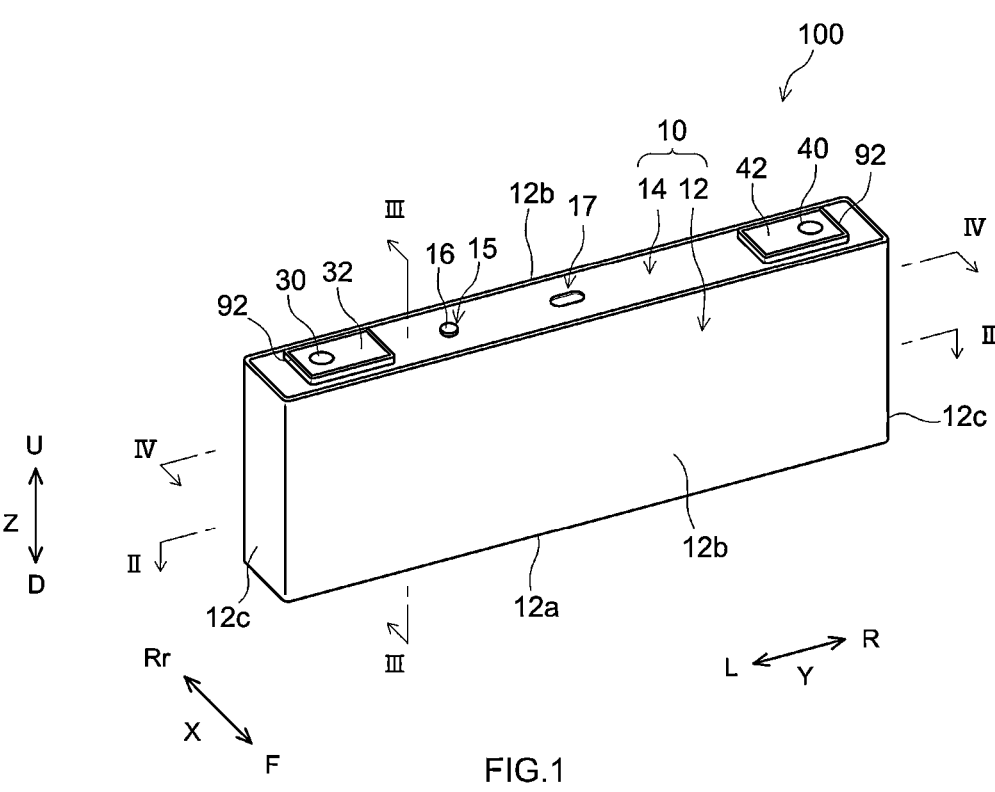
FIG. 1 is a perspective view schematically illustrating a battery according to an embodiment.
Figure 2:
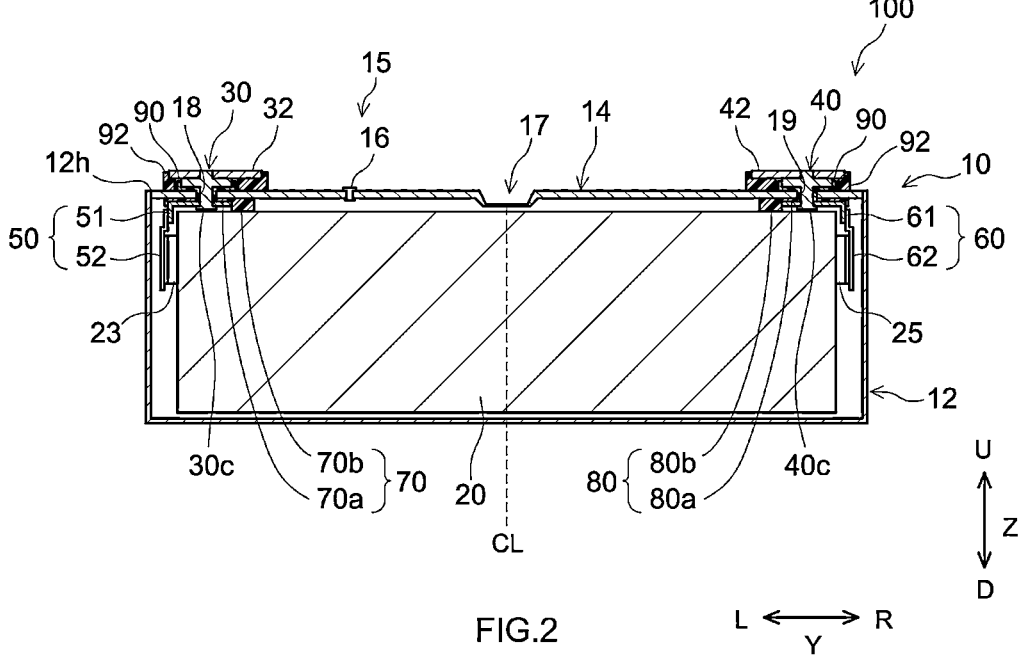
FIG. 2 is a schematic longitudinal sectional view taken along line II-II of FIG. 1.
Figure 3:
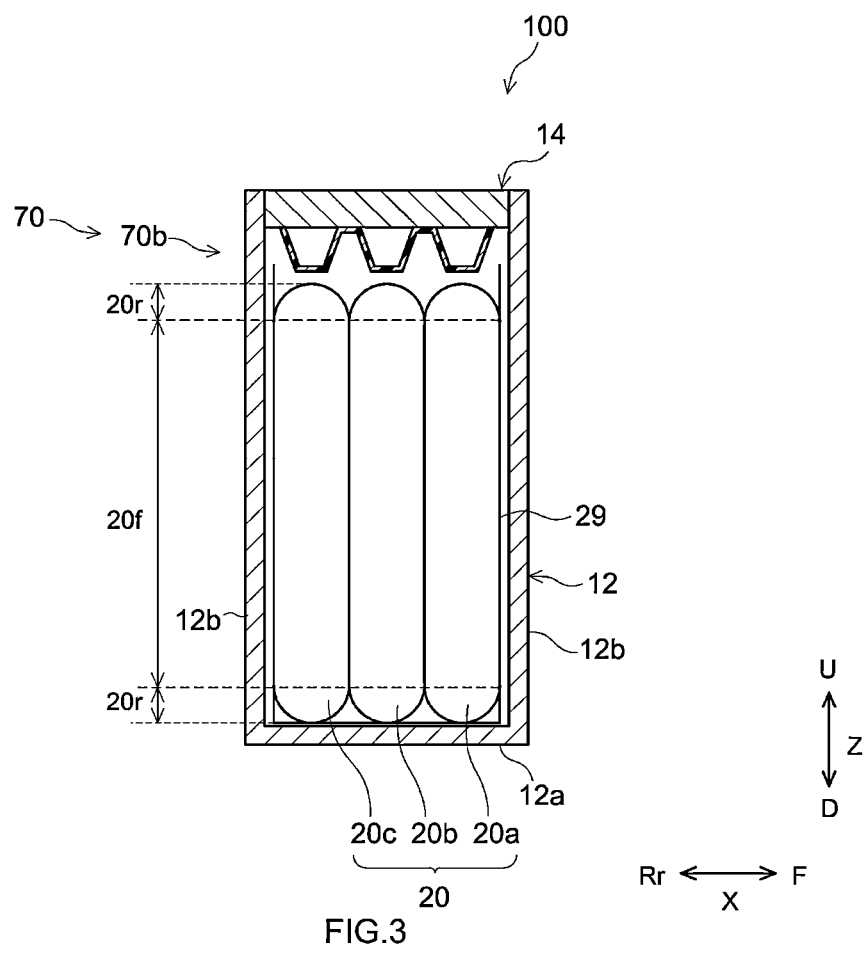
FIG. 3 is a schematic longitudinal sectional view taken along line III-III of FIG. 1.
Figure 4:
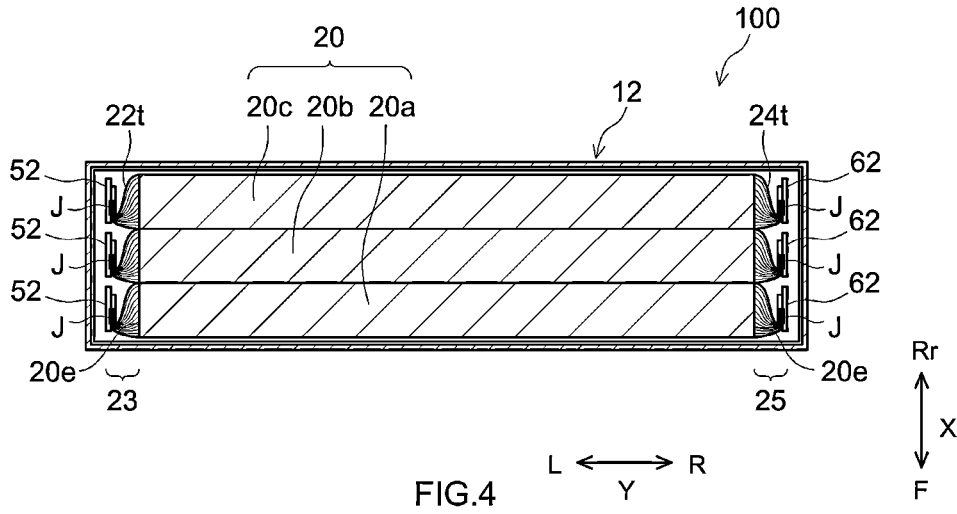
FIG. 4 is a schematic transverse sectional view taken along line IV-IV of FIG. 1.

FIG. 1 is a perspective view of the battery 100. FIG. 2 is a schematic longitudinal sectional view taken along line II-II of FIG. 1. FIG. 3 is a schematic longitudinal sectional view taken along line III-III of FIG. 1. FIG. 4 is a schematic transverse sectional view taken along line IV-IV of FIG. 1. In the following description, the reference signs L, R, F, Rr, U, and D in the drawings represent left, right, front, rear, top, and bottom, and the signs X, Y, and Z in the drawings represent the short side direction, long side direction orthogonal to the short side direction, and up-down direction of battery 100, respectively. Such directions are defined for convenience of explanation and are not intended to limit the installation configuration of the battery 100.

As shown in FIG. 2, a battery 100 includes a battery case 10, an electrode assembly group 20, a positive electrode terminal 30, and a negative electrode terminal 40. Although not shown in the drawings, the battery 100 further includes an electrolyte. The battery 100 herein is a lithium ion secondary battery.

The battery case 10 is a housing for housing the electrode assembly group 20. The battery case 10 herein has a flat, bottomed rectangular (square) outside shape. The material of the battery case 10 may be the same as a commonly used material without particular limitations. The material of the battery case 10 is preferably metal, and more preferably aluminum, an aluminum alloy, iron, an iron alloy, or the like, for example. As shown in FIG. 2, the battery case 10 includes an exterior body 12 having an opening 12h and a sealing plate (lid) 14 sealing the opening 12h.

As shown in FIG. 1, the exterior body 12 has a bottom wall 12a, a pair of long side walls 12b extending from the bottom wall 12a and facing each other, and a pair of short side walls 12c extending from the bottom wall 12a and facing each other. The bottom wall 12a has a substantially rectangular shape. The bottom wall 12a faces the opening 12h. The area of each short side wall 12c is larger than the area of the long side wall 12b.

The sealing plate 14 is attached to the exterior body 12 so as to seal the opening 12h of the exterior body 12. The sealing plate 14 faces the bottom wall 12a of the exterior body 12. The sealing plate 14 has a substantially rectangular shape in plan view. The battery case 10 is integrated by the sealing plate 14 bonded (e.g., by welding) to the periphery of the opening 12h of the exterior body 12. The battery case 10 is hermetically sealed (airtight).

As shown in FIG. 2, the sealing plate 14 is provided with a liquid injection hole 15, a gas discharge valve 17, and two terminal outlets 18 and 19. The liquid injection hole 15 is for injecting an electrolyte after assembling of the sealing plate 14 to the exterior body 12. The liquid injection hole 15 is sealed with a sealing member 16. The gas discharge valve 17 is configured to be broken and to discharge gas inside the battery case 10 to the outside when the pressure inside the battery case 10 exceeds a predetermined value. The terminal outlets 18 and 19 are formed in both ends of the sealing plate 14 in the long side direction Y. The terminal outlets 18 and 19 penetrate the sealing plate 14 in the up-down direction Z. The terminal outlets 18 and 19 have inner diameters which allow the positive electrode terminal 30 and the negative electrode terminal 40 to be inserted thereinto respectively before being attached to the sealing plate 14 (e.g., before being crimping-processed).

The electrolyte may be the same as a commonly used one without particular limitations. The electrolyte is, for example, a nonaqueous electrolyte containing nonaqueous solvent and a supporting electrolyte. Examples of the non-aqueous solvent include carbonates such as ethylene car-bonate, dimethyl carbonate, and ethyl methyl carbonate. Examples of the supporting electrolyte include fluorine-containing lithium salts such as $LiPF_6$. The electrolyte may be solid (solid electrolyte) and integral with the electrode assembly group 20.

The positive electrode terminal 30 and the negative elec-trode terminal 40 are both fixed to the sealing plate 14. The positive electrode terminal 30 is arranged on one side of the sealing plate 14 in the long side direction Y 'left side in FIGS. 1 and 2). The negative electrode terminal 40 is arranged on the other side of the sealing plate 14 in the long side direction Y (right side in FIGS. 1 and 2). As shown in FIG. 1, the positive electrode terminal 30 and the negative electrode terminal 40 are exposed on the outer surface of the sealing plate 14. As shown in FIG. 2, the positive electrode terminal 30 and the negative electrode terminal 40 pass through the terminal outlets 18 and 19, respectively, and extend to the outside form the inside of the sealing plate 14.

As shown in FIG. 2, the positive electrode terminal 30 is electrically connected to the positive electrode plate 22 (see FIG. 7) of the electrode assembly group 20 through a positive electrode collecting member 50 inside the exterior body 12. The positive electrode terminal 30 is insulated from the sealing plate 14 by a positive electrode insulating member 70 and a gasket 90. The positive electrode terminal 30 is made of preferably metal, more preferably aluminum or an aluminum alloy, for example.

The negative electrode terminal 40 is electrically con-nected to a negative electrode plate 24 (see FIG. 7) of the electrode assembly group 20 via the negative electrode collecting member 60 inside the exterior body 12. The negative electrode terminal 40 is insulated from the sealing plate 14 by a negative electrode insulating member 80 and the gasket 90. The negative electrode terminal 40 is made of preferably metal, more preferably copper or a copper alloy, for example. The negative electrode terminal 40 may be configured by two electroconductive members bonded thereto and integrated herewith. For example, a portion connected to the negative electrode collecting member 60 is made of copper or a copper alloy, and a portion exposed on the outer surface of the sealing plate 14 may be made of aluminum or an aluminum alloy.

As shown in FIG. 1, a plate-like positive electrode exter-nal electroconductive member 32 and a plate-like negative electrode external electroconductive member 42 are attached to the outer surface of the sealing plate 14. The positive electrode external electroconductive member 32 is electrically connected to the positive electrode terminal 30. The negative electrode external electroconductive member 42 is electrically connected to the negative electrode termi-nal 40. The positive electrode external electroconductive member 32 and the negative electrode external electrocon-ductive member 42 are members to which busbars are attached when multiple batteries 100 are electrically con-nected to each other. The positive electrode external elec-troconductive member 32 and the negative electrode exter-nal electroconductive member 42 are made of preferably metal, more preferably aluminum or an aluminum alloy, for example. The positive electrode external electroconductive member 32 and the negative electrode external electrocon-ductive member 42 are insulated from the sealing plate 14 by an external insulating member 92. The positive electrode external electroconductive member 32 and the negative electrode external electroconductive member 42 are not essential and can be omitted in other embodiments.

Figure 5:
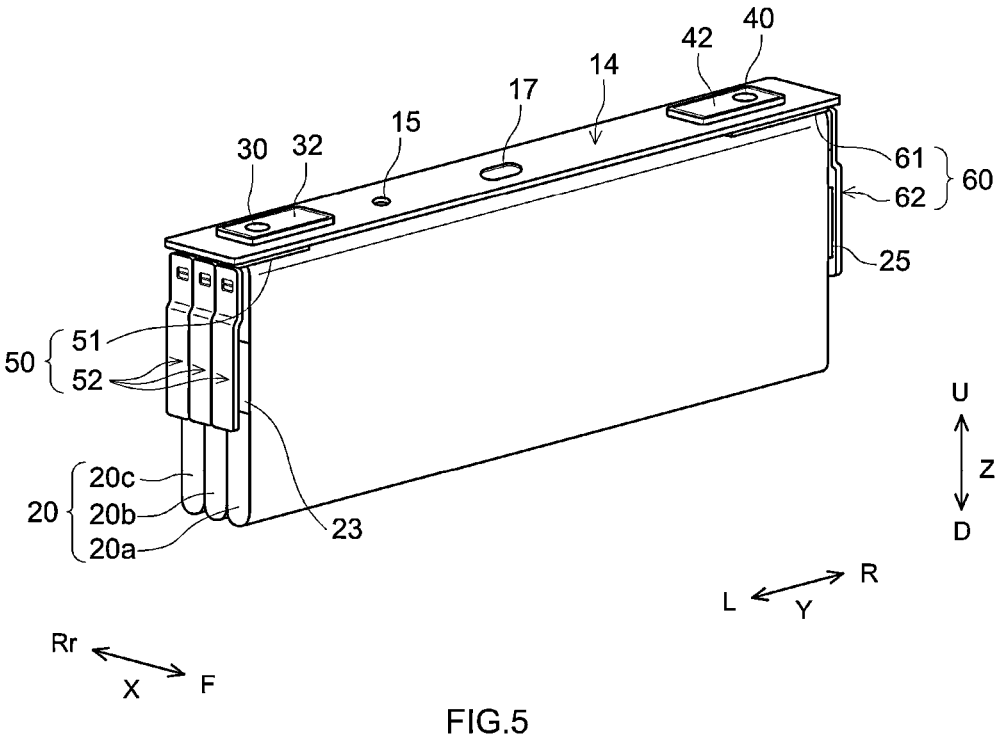
FIG. 5 is a perspective view schematically illustrating an electrode assembly group attached to a sealing plate.

FIG. 5 is a perspective view schematically illustrating the electrode assembly group 20 attached to the sealing plate 14. The electrode assembly group 20 herein includes three wound electrode assemblies 20a, 20b, and 20c. The number of wound electrode assemblies arranged inside a single exterior body 12 is not particularly limited, and may be two or more (multiple) or one. The electrode assembly group 20 herein is arranged inside the exterior body 12 with being covered with an electrode assembly holder 29 (see FIG. 3) made of a resin sheet.

Figure 6:
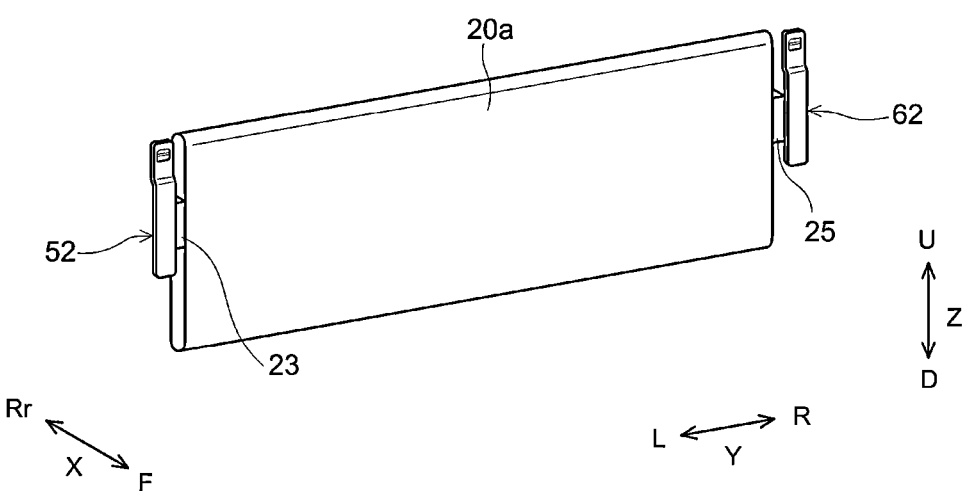
FIG. 6 is a perspective view schematically illustrating an electrode assembly to which a positive electrode second collecting member and a negative electrode second collecting member are attached.
Figure 7:
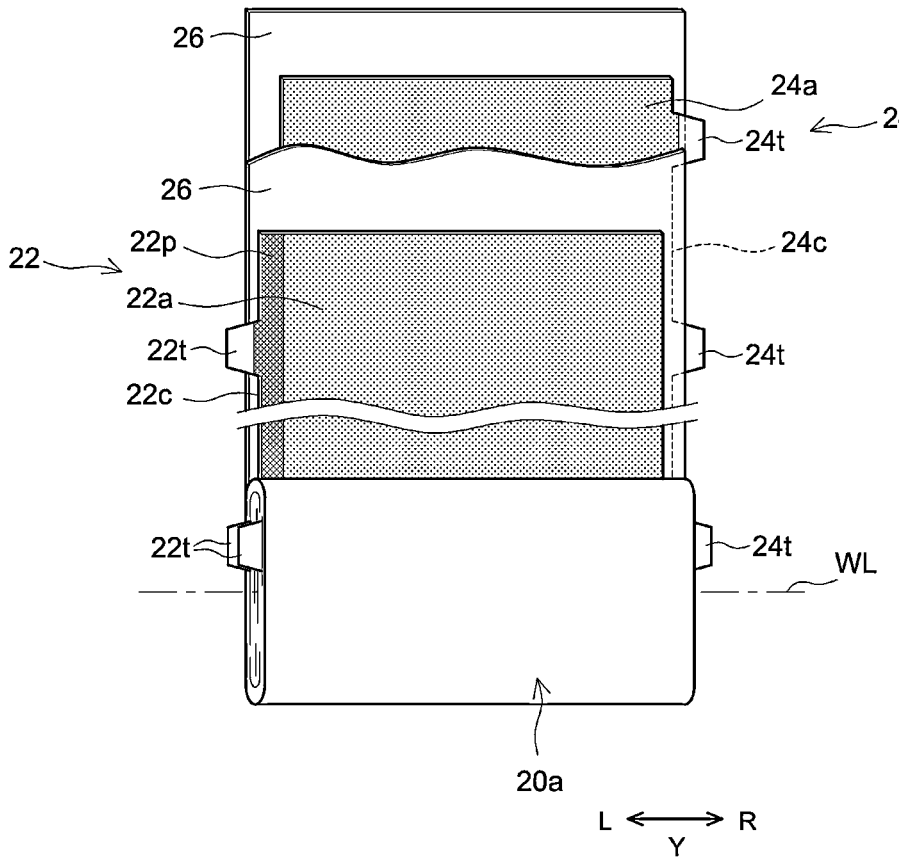
FIG. 7 is a schematic view illustrating a configuration of a wound electrode assembly.

FIG. 6 is a perspective view schematically illustrating the wound electrode assembly 20a. FIG. 7 is a schematic view illustrating a configuration of the wound electrode assembly 20a. The wound electrode assembly 20a will be described in detail below as an example, but the same configuration can be applied to the wound electrode assemblies 20b and 20c.

The wound electrode assembly 20a includes a positive electrode plate 22, a negative electrode plate 24, and a separator 26. The wound electrode assembly 20a is config-ured such that a strip-like positive electrode plate 22 and a strip-like negative electrode plate 24 are stacked via two strip-like separators 26, and wound around the winding axis WL. The wound electrode assembly 20a has a flat shape. The wound electrode assembly 20a is arranged inside the exterior body 12 so that the winding axis WL is substantially parallel with the long side direction Y. As shown in FIG. 3, the wound electrode assembly 20a includes a pair of curved portions (R portions) 20r facing the bottom wall 12a of the exterior body 12 and the sealing plate 14, a flat portion 20f which connects the pair of curved portions 20r and faces the long side wall 12b of the exterior body 12. The flat portion 20f extends along the long side wall 12b.

The separators 26 are each a member insulating between the positive electrode active material layer 22a of the positive electrode plate 22 and the negative electrode active material layer 24a of the negative electrode plate 24. The separators 26 herein each constitute an outer surface of the wound electrode assembly 20a. The separators 26 are each suitably a resin-made porous sheet made of a polyolefin resin such as polyethylene (PE) and polypropylene (PP). The separator 26 preferably includes a base portion made of the resin-made porous sheet and a heat-resistance layer (HRL) formed on at least one surface of the base portion. The heat-resistance layer is a layer containing an inorganic filler. Examples of the inorganic filler used include alumina, boehmite, aluminium hydroxide, and titania.

As shown in FIG. 7, the positive electrode plate 22 includes: a positive electrode substrate 22c, and a positive electrode active material layer 22a and a positive electrode protective layer 22p fixed to at least one surface of the positive electrode substrate 22c. Note that the positive electrode protective layer 22p is not essential, and may be omitted in other embodiments. The positive electrode substrate 22c has a strip shape. The positive electrode substrate 22c is made of, for example, an electroconductive metal such as aluminum, an aluminum alloy, nickel, and stainless steel. The positive electrode substrate 22c herein is a metal foil, specifically an aluminum foil. The average thickness of the positive electrode substrate 22c is not particularly limited. For example, the average thickness is preferably 2 μm to 30 μm, more preferably 2 μm to 20 μm, yet more preferably 5 μm to 15 μm. The positive electrode plate 22 is an example of an electrode plate.

At one end of the positive electrode substrate 22c in the long side direction Y (left end in FIG. 7), multiple positive electrode tabs 22t are provided. The positive electrode tabs 22t protrude from one side (left side in FIG. 7) of the positive electrode plate 22 in the long side direction Y. The positive electrode tabs 22t protrude further in the long side direction Y than the separators 26. The positive electrode tabs 22t are spaced (intermittently) along the longitudinal direction of the positive electrode plate 22. The positive electrode tabs 22t may be provided at the other end (right end in FIG. 7) in the long side direction Y, or at both ends in the long side direction Y. Each positive electrode tab 22t is part of the positive electrode substrate 22c, and made of a metal foil (aluminum foil). On at least part of the positive electrode tab 22t, the positive electrode active material layer 22a and the positive electrode protective layer 22p are not disposed, and the positive electrode substrate 22c is exposed. Each positive electrode tab 22t is an example of an electrode tab.

As shown in FIG. 4, multiple positive electrode tabs 22t are stacked at one end in the long side direction Y (left end in FIG. 4) and constitute the positive electrode tab group 23. The positive electrode tabs 22t are bent and curved so that their outer ends are aligned. This improves an ability of housing the battery 100 in the battery case 10, thereby downsizing the battery 100. The positive electrode tab group 23 is electrically connected to the positive electrode terminal 30 via the positive electrode collecting member 50. The positive electrode tabs 22t are preferably bent and electrically connected to the positive electrode terminal 30. The positive electrode tab group 23 is attached to a positive electrode second collecting member 52 to be described later.

The positive electrode active material layer 22a is provided in a strip shape along the longitudinal direction of the strip-like positive electrode substrate 22c, as shown in FIG. 7. The positive electrode active material layer 22a contains a positive electrode active material (e.g., a lithium-transition metal composite oxide such as lithium-nickel-cobalt-manganese composite oxide) which can reversibly store and release charge carriers. The content of the positive electrode active material is approximately 80 mass % or more, typically 90 mass % or more, for example, 95 mass % or more relative to 100 mass % of the entire solid content of the positive electrode active material layer 22a. The positive electrode active material layer 22a may further contain optional components such as an electroconductive material, a binder, and various additives besides the positive electrode active material. The electroconductive material used may be, for example, a carbon material such as acetylene black (AB). The binder used may be, for example, polyvinylidene fluoride (PVdF).

As shown in FIG. 7, the positive electrode protective layer 22p is provided at the boundary between the positive electrode substrate 22c and the positive electrode active material layer 22a in the long side direction Y. The positive electrode protective layer 22p herein is provided at one end (left end in FIG. 7) of the positive electrode substrate 22c in the long side direction Y. The positive electrode protective layer 22p may be provided at each of both ends in the long side direction Y. The positive electrode protective layer 22p is provided in a strip shape along the positive electrode active material layer 22a. The positive electrode protective layer 22p may contain an inorganic filler (e.g., alumina). The content of the inorganic filler is approximately 50 mass % or more, typically 70 mass % or more, for example, 80 mass % or more relative to 100 mass % of the entire solid content of the positive electrode protective layer 22p. The positive electrode protective layer 22p may further contain optional components such as an electroconductive material, a binder, and various additives besides the inorganic filler. The electroconductive material and the binder may be the same as those illustrated as possible to be contained in the positive electrode active material layer 22a.

Figure 8:
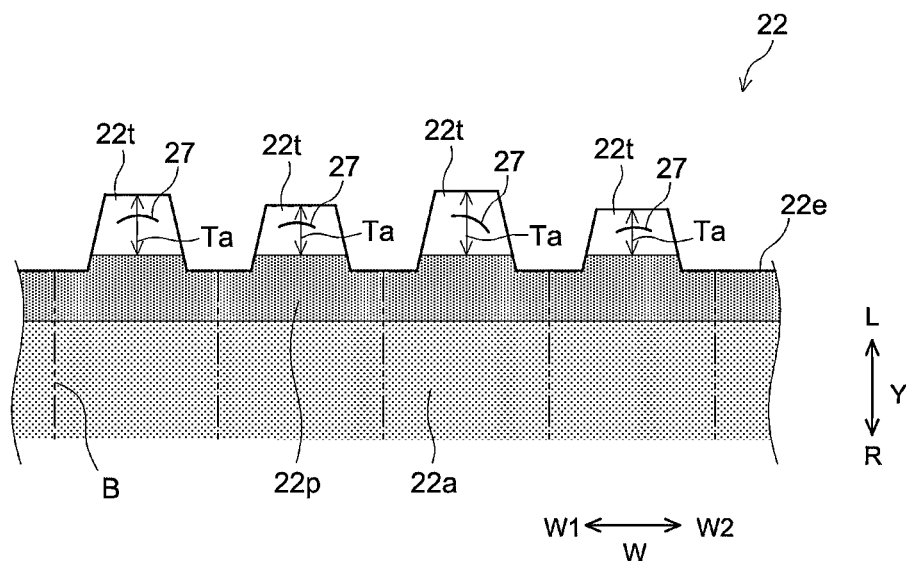
FIG. 8 is a schematic plan view of a positive electrode according to an embodiment.
Figures 9, 10:
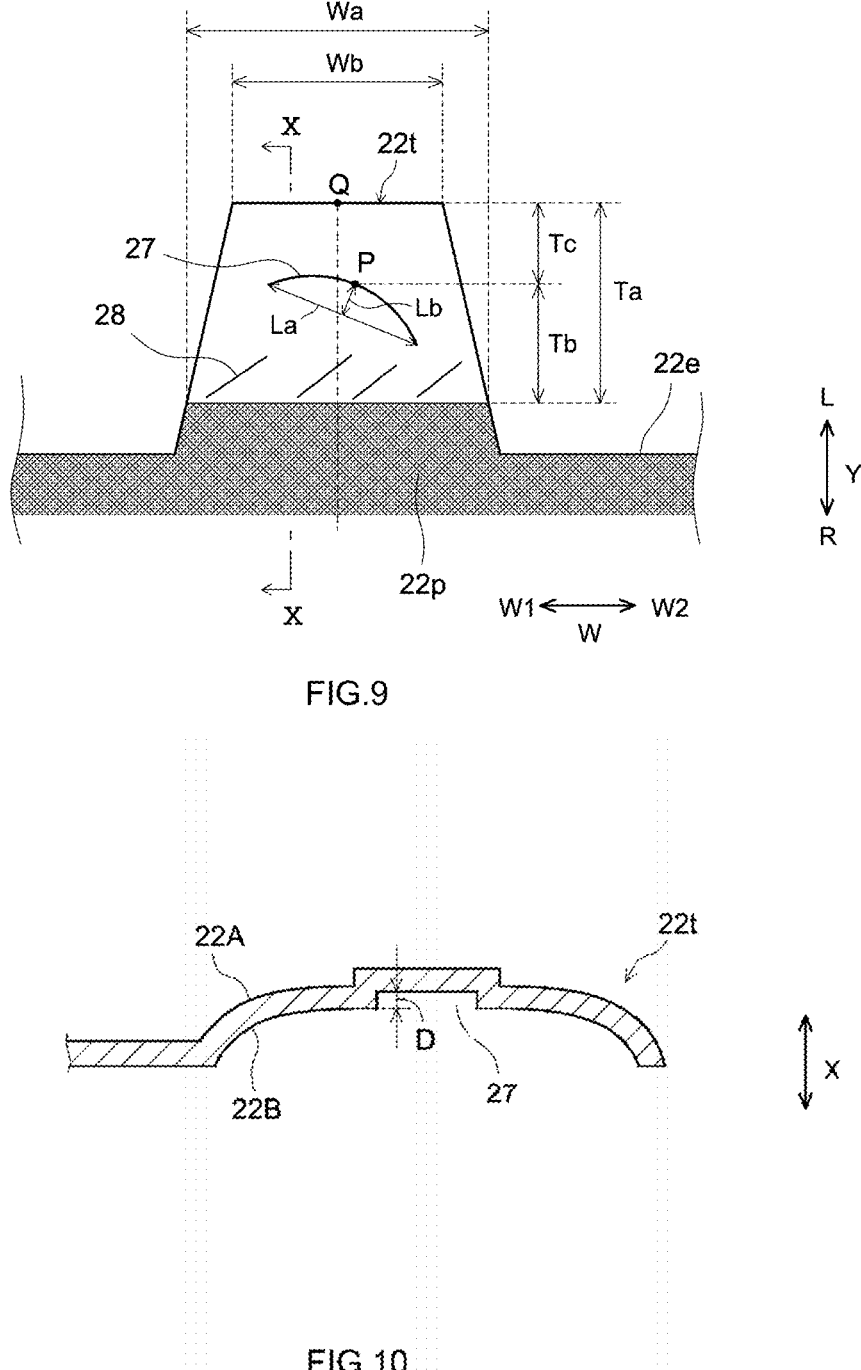
FIG. 9 is a partially enlarged sectional view schematically illustrating the vicinity of a positive electrode tab of FIG. 8.
FIG. 10 is a schematic sectional view taken along line X-X of FIG. 9.

FIG. 8 is a schematic plan view of the positive electrode plate 22. FIG. 9 is a schematic enlarged view of the vicinity of the positive electrode tab 22t of FIG. 8. FIG. 10 is a schematic sectional view taken along line X-X of FIG. 9. In the following description, the reference sign Y and W in FIGS. 8 and 9 represent protruding direction in which the positive electrode tabs 22t protrude and a width direction orthogonal to the protruding direction, respectively. The reference sign X of FIG. 10 represents the thickness direction of the positive electrode tabs 22t. The width direction W coincides with the winding direction of the wound electrode assembly 20a. The reference signs W1 and W2 represent the beginning side and the end side of the winding direction, respectively. The protruding direction Y coincides with the long side direction Y of the battery 100. The thickness direction X coincides with the short side direction X of the battery 100. The reference sign B represents the bending point to be bent to form the curved portion 20r in producing of the electrode assembly to be described later. Hereinafter, the positive electrode tabs 22t of the positive electrode plate 22 will be described in detail as an example, but the same configuration can be used for the negative electrode plate 24 (specifically, negative electrode tabs 24t to be described later).

As shown in FIG. 8, the positive electrode plate 22 has an edge side 22e extending along the width direction W. The positive electrode tabs 22t protrude from the edge side 22e toward one side (upper side in FIG. 8) of the protruding direction Y. The positive electrode tabs 22t herein are multiple. The positive electrode tabs 22t extend from the base which is continuous to the edge side 22e of the positive electrode plate 22. The shape of each positive electrode tab 22*t* is not particularly limited. The shape may be polygonal shape such as quadrangle or triangle, or semicircular. The shape of each positive electrode tab 22*t* may be, for example, trapezoidal such as an isopod trapezoidal, rectangular, or square. The positive electrode tab 22*t* may be provided in a symmetrical shape with respect to the width direction W. The shape of each positive electrode tab 22*t* is preferably trapezoidal. Accordingly, breakage of tabs is less likely to occur in producing of the electrode assembly. Further, the current is less likely to be concentrated at the base, concentration of the heat near the base and the increase in the resistance near the base during charging/discharging of the battery 100 can be reduced.

The size of each positive electrode tab 22*t* (e.g., the length Ta in the protruding direction Y and/or the tab length in the width direction W) is not particularly limited. For example, the length Ta in the protruding direction Y may be about 15 mm to about 25 mm. The length Wa of the positive electrode tab 22*t* near its base may be about 25 mm to about 45 mm. The length Wb of the positive electrode tab 22*t* near the tip may be preferably about 15 mm to about 25 mm (e.g., about 20 mm). The positive electrode tab 22*t* within the ranges in size ensures a sufficient bonding region, and increases the bonding strength in the bonding.

The positive electrode tab 22*t* may be flat or curved in the thickness direction X (see FIG. 10). It is preferred that the center portion of the positive electrode tab 22*t* in the width direction W is convexly curved toward one of the thickness directions X. When the positive electrode tab 22*t* is curved, the ratio between the length Wa of the positive electrode tab 22*t* near its base and the maximum height of the convex curved portion is about 8:1 to about 10:1.

The sizes of the positive electrode tabs 22*t* may be the same as or different from each other. As shown in FIG. 8, if the lengths Ta of the positive electrode tabs 22*t* in the protruding direction differ from each other, the differences between the lengths Ta of the positive electrode tabs 22*t* in the protruding direction are preferably within ±10 mm, more preferably within ±5 mm.

The positive electrode tabs 22*t* herein are preferably provided one by one in the regions separated by the bending points B. Specifically, the number of the positive electrode tabs 22*t* is preferably the same as the number of layers of the positive electrode plate 22 (one tab/one layer).

As shown in FIGS. 8 and 9, each positive electrode tab 22*t* has an arc-shaped wrinkle 27. The arc-shaped wrinkle refers typically to a wrinkle formed by bending the positive electrode tab 22*t* into a corrugated shape due to a force applied thereto in the width direction W, and does not include wrinkles formed by folding. Such an arc-shaped wrinkle is formed in the positive electrode tab 22*t* to reduce bending of the positive electrode tab 22*t* at its tip in the protruding direction Y. For example, it is possible to reduce breakage of the positive electrode tab 22*t* at its tip when conveying the positive electrode plate 22 in manufacturing. This allows each process in manufacturing of the positive electrode plate 22 to be performed with the positive electrode tabs 22*t* remaining in good condition without breakage. Specifically, bonding to be described later can be performed stably, and the bonding strength between the positive electrode tab group 23 and the positive electrode collecting member 50 is increased. Accordingly, batteries with high bonding strength and high reliability can be provided.

A single arc-shaped wrinkle 27 or multiple (i.e., two or more) arc-shaped wrinkles 27 may be formed in each of the positive electrode tabs 22*t*. A single arc-shaped wrinkle 27 in each of the positive electrode tabs 22*t* is preferable.

In some aspects, the arc-shaped wrinkle 27 is, as shown in FIG. 9, preferably is convex toward a tip of the protruding direction Y of each of the electrode tabs. Although not particularly limited thereto, the length of the arc of the arc-shaped wrinkle 27 is, for example, preferably 10 mm or more. If the length of the arc of the arc-shaped wrinkle 27 is too short, the effect of reducing bending of the positive electrode tabs 22*t* may be reduced as mentioned above. The width (the length of the arc string) La and the maximum height (the height from the apex P of the arc to the arc string) Lb of the arc-shaped wrinkle 27 are not particularly limited. For example, the ratio between the width La of the arc-shaped wrinkle 27 and the maximum height Lb of the arc-shaped wrinkle 27 is adjusted preferably to about 2:1 to about 5:1.

In some aspects, the shape of the arc-shaped wrinkle 27 is, as shown in FIG. 9, preferably formed in a shape asymmetrical with respect to the width direction W of the positive electrode tab 22*t*. Specifically, the apex P of the arc-shaped wrinkle 27 is preferably not on the center line Q of the length Wa of the positive electrode tab 22*t* near its base in the width direction. The apex P of the arc-shaped wrinkle 27 is preferably formed so as to be located on the tip side rather than on the base side in the protruding direction Y. Such an arc-shaped wrinkle 27 more suitably reduce bending of the positive electrode tab 22*t*.

In some aspects, if the lengths Ta of the positive electrode tabs 22*t* in the protruding direction differ from each other, lengths Tb from the respective bases of the positive electrode tabs 22*t* to respective apexes P of the arc-shaped wrinkles 27 in the protruding direction are preferably substantially the same. Accordingly, bending of the positive electrode tabs 22*t* can be suitably reduced. The lengths Tc from the respective tips of the positive electrode tabs 22*t* to the respective apexes P of the arc-shaped wrinkles 27 in the protruding direction may be substantially the same or differ from each other. The lengths Tc in the protruding direction preferably differ from each other. If the lengths Tc in the protruding direction differ from each other, the differences between the lengths Tc may be substantially the same as the differences between the lengths Ta of the positive electrode tabs 22*t* in the protruding direction.

As shown in FIG. 10, the arc-shaped wrinkle 27 may be a convex portion or a concave portion formed in the surfaces 22A and 22B of each positive electrode tab 22*t*. For example, the arc-shaped wrinkle 27 may have a convex portion protruding toward the surface 22A of the positive electrode tab 22*t* at height D. The convex portion may be a convex portion protruding toward the surface 22A of the positive electrode tab 22*t* or a convex portion protruding toward the surface 22B. If the center portion of the positive electrode tab 22*t* in the width direction W is convexly curved toward the thickness direction X as mentioned above, the convex portion of the arc-shaped wrinkle 27 may protrude in the same direction as the direction toward which the positive electrode tab 22*t* is convexly curved.

In some aspects, as shown in FIG. 9, the positive electrode tab 22*t* may be provided with linear wrinkles 28 besides the arc-shaped wrinkle 27. The linear wrinkles 28 extend from the base side of the positive electrode tab 22*t* (more specifically, the boundary between the positive electrode protective layer 22*p* and the positive electrode substrate 22*c*) toward the tip of the positive electrode tab 22*t*. The linear wrinkles 28 may be approximately linear. Further, as shown in FIG. 9, the linear wrinkles 28 may be inclined with respect to the protruding direction Y. The positive electrode tab 22*t* provided with the linear wrinkles 28 besides the arc-shaped wrinkle 27 reduces breakage of the positive electrode tab 22*t*.

If the positive electrode tab 22*t* is provided with the linear wrinkles 28 besides the arc-shaped wrinkle 27, the arc-shaped wrinkle 27 preferably does not intersect the linear wrinkles 28.

Each of the positive electrode tabs 22*t* may have a single linear wrinkle 28 or multiple (i.e., two or more) linear wrinkles 28. Each of the positive electrode tabs 22*t* may have multiple linear wrinkles 28 preferably. If linear wrinkles 28 are formed, the linear wrinkles 28 may be formed at predetermined intervals in the width direction W so that they do not intersect each other, or the linear wrinkles 28 may be formed so that they interest each other. The linear wrinkles 28 preferably extend in the same direction to be substantially parallel with each other.

Although not particularly limited thereto, the length Ld of each linear wrinkle 28 is, for example, preferably 2 mm or more. The linear wrinkles 28 each have a concave portion in the thickness direction of the positive electrode tab 22*t*. The depth of the concave portion in each linear wrinkle 28 is preferably shallower than the depth of the concave portion of the arc-shaped wrinkle 27. The concave portion may be a concave portion protruding toward the surface 22B of the positive electrode tab 22*t* or a concave portion protruding toward the surface 22A.

As shown in FIG. 7, the negative electrode plate 24 includes: a negative electrode substrate 24*c*, and a negative electrode active material layer 24*a* fixed to at least one surface of the negative electrode substrate 24*c*. The negative electrode substrate 24*c* has a strip shape. The negative electrode substrate 24*c* is made of, for example, an electroconductive metal such as copper, a copper alloy, nickel, and stainless steel. The negative electrode substrate 24*c* herein is a metal foil, specifically a copper foil. The negative electrode plate 24 is an example of the electrode plate.

At one end of the negative electrode substrate 24*c* in the long side direction Y (right end in FIG. 7), multiple negative electrode tabs 24*t* are provided. The negative electrode tabs 24*t* protrude further in the long side direction Y than the separators 26. The negative electrode tabs 24*t* protrude further in the long side direction Y than the separators 26. The negative electrode tabs 24*t* are spaced (intermittently) along the longitudinal direction of the negative electrode plate 24. The negative electrode tabs 24*t* protrude from one side (right side in FIG. 7) of the negative electrode substrate 24*c* in the long side direction Y. The negative electrode tabs 24*t* may be provided at the other end (left end in FIG. 7) in the long side direction Y, or at both ends in the long side direction Y. Each negative electrode tab 24*t* is part of the negative electrode substrate 24*c*, and made of a metal foil (copper foil). On at least part of the negative electrode tab 24*t*, the negative electrode active material layer 24*a* is formed. On at least part of the negative electrode tab 24*t*, the negative electrode active material layer 24*a* is not formed, and the negative electrode substrate 24*c* is exposed. The negative electrode tab 24*t* is an example of the electrode tab.

As shown in FIG. 4, multiple negative electrode tabs 24*t* are stacked at one end in the long side direction Y (right end in FIG. 6) and constitute the negative electrode tab group 25. The negative electrode tab group 25 is provided at a position symmetrical to the positive electrode tab group 23 in the long side direction Y. The negative electrode tabs 24*t* are bent and curved so that their outer ends are aligned. This improves an ability of housing the battery 100 in the battery case 10, thereby downsizing the battery 100. The negative electrode tab group 25 is electrically connected to the negative electrode terminal 40 via the negative electrode collecting member 60. The negative electrode tabs 24*t* are preferably bent and electrically connected to the negative electrode terminal 40. The negative electrode tab group 25 is attached to a negative electrode second collecting members 62 to be described later.

The negative electrode active material layer 24*a* is provided in a strip shape along the longitudinal direction of the strip-like negative electrode substrate 24*c*, as shown in FIG. 7. The negative electrode active material layer 24*a* contains a negative electrode active material (e.g., a carbon material such as graphite) which can reversibly store and release charge carriers. The content of the negative electrode active material is approximately 80 mass % or more, typically 90 mass % or more, for example, 95 mass % or more relative to 100 mass % of the entire solid content of the negative electrode active material layer 24*a*. The negative electrode active material layer 24*a* may further contain optional components such as a binder, a dispersant, and various additives. Examples of the binder used include rubbers such as styrene-butadiene rubber (SBR). Examples of the dispersant used include celluloses such as carboxymethyl cellulose (CMC).

The positive electrode collecting member 50 constitutes a conductive path which electrically connects between the positive electrode tab group 23 made of multiple positive electrode tabs 22*t* and the positive electrode terminal 30. As shown in FIGS. 2 and 5, the positive electrode collecting member 50 includes: a positive electrode first collecting member 51 which is a plate-like electroconductive member extending along the inner surface of the sealing plate 14; and multiple positive electrode second collecting members 52 which are plate-like electroconductive members extending along an up-down direction Z. The lower end 30*c* of the positive electrode terminal 30 extends toward inside of the battery case 10 through the terminal outlet 18 of the sealing plate 14, and is connected to the positive electrode first collecting member 51 (see FIG. 2). On the other hand, as shown in FIGS. 4 to 6, the positive electrode second collecting members 52 are connected to the respective positive electrode tab groups 23 of the wound electrode assemblies 20*a*, 20*b*, and 20*c*. The positive electrode first collecting member 51 and the positive electrode second collecting members 52 may be made of the same metal species as the positive electrode substrate 22*c*, for example, an electroconductive metal such as aluminum, an aluminum alloy, nickel, stainless steel. The positive electrode collecting member 50 is an example of an electrode collecting member.

The lower end 30*c* of the positive electrode terminal 30 extends toward inside of the battery case 10 through the terminal outlet 18 of the sealing plate 14, and is connected to the positive electrode first collecting member 51 (see FIG. 2). On the other hand, as shown in FIGS. 4 to 6, the positive electrode second collecting members 52 are connected to the respective positive electrode tab groups 23 of the wound electrode assemblies 20*a*, 20*b*, and 20*c*. Further, as shown in FIGS. 4 and 5, the positive electrode tab groups 23 of the wound electrode assemblies 20*a*, 20*b*, and 20*c* are bent so that the positive electrode second collecting members 52 face one side surfaces 20*e* of the wound electrode assemblies 20*a*, 20*b*, and 20*c*. Accordingly, the upper ends of the positive electrode second collecting members 52 are electrically connected to the positive electrode first collecting member 51.

In the positive electrode tab group 23 where positive electrode tabs 22*t* are stacked, the positions of the above-described arch-shaped wrinkle 27 formed in the respective positive electrode tabs 22*t* preferably differ from each other. A region where the arc-shaped wrinkle 27 is formed is relatively hard. Thus, when portions where the arc-shaped wrinkles 27 are formed in the respective positive electrode tabs 22*t* of the positive electrode tab group 23 differ from each other, the strength of the entire positive electrode tab group 23 can be improved.

As mentioned above, when the positive electrode tabs 22*t* are convexly curved toward the thickness direction X (see FIG. 10) of the positive electrode tabs 22*t*, the protruding directions of the convex portions of the positive electrode tabs 22*t* of multiple positive electrode tab groups 23 stacked may be the same. This allows for easy bending when bending is performed so that the positive electrode second collecting members 52 face the side surfaces 20*e* of the wound electrode assemblies 20*a*, 20*b*, and 20*c*. When the center portion of the positive electrode tab 22*t* in the width direction W is convexly curved toward the thickness direction X, the center is preferably convexly curved away from the positive electrode second collecting members 52 (i.e., concavely curved toward the positive electrode second collecting members 52). This reduces breakage of the positive electrode tab 22*t* in the bonding to be described below and allows formation of suitable bonding portion. Although not particularly limited thereto, when the center portion of the positive electrode tab 22*t* in the width direction W is convexly curved toward the thickness direction X, the center is preferably convexly curved toward the outside of the radial direction of the wound electrode assembly 20*a*. This can more suitably produce the wound electrode assembly 20*a* in the producing of an electrode assembly to be described below.

Each positive electrode second collecting member 52 is a portion attached to the positive electrode tab group 23 and electrically connected to the positive electrode tabs 22*t*. As shown in FIG. 4, a bonding portion J to the positive electrode tab group 23 is formed in each positive electrode second collecting member 52. The bonding portion J is, for example, a welded bonding portion formed by welding such as ultrasound welding, resistance welding, and laser welding with the positive electrode tabs 22*t* stacked. The bonding portion J may have the above-mentioned arc-shaped wrinkle 27. The arc-shaped wrinkle 27 formed in the bonding portion J allows suitable welding in the state where bending of the tips of the positive electrode tabs 22*t* is reduced. This more suitably reduces bonding defects and the like, thereby increasing the bonding strength of the bonding portion J and providing a battery 100 with high reliability.

Figure 11:
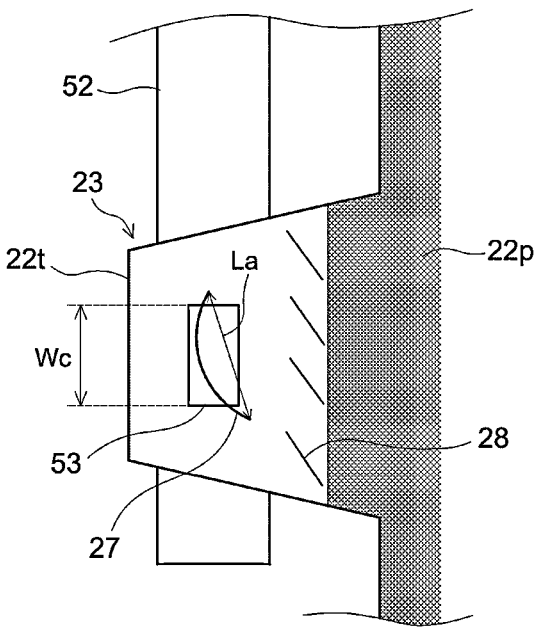
FIG. 11 is a partially enlarged view schematically illustrating the vicinity of a bonding portion of FIG. 4.

FIG. 11 is an enlarged view schematically illustrating the vicinity of a bonding portion J of FIG. 4. In some aspects, bonding between the positive electrode second collecting members 52 and the positive electrode tab group 23 is achieved by ultrasound welding), and the bonding portion J has a bonding mark 53. Here, the bonding mark 53 is composed of multiple recesses. Specifically, the bonding mark 53 is a collection of recesses formed by using the horn of the ultrasonic bonding machine in the ultrasonic bonding. The bonding mark 53 may have a shape where inverted quadrangular pyramidal recesses corresponding to the tip shapes of the horn of the ultrasonic bonding machine are arranged in contact with each other. The shape of the bonding mark 53 (i.e., the entire shape of the collection of the recesses) has a substantially square shape in plan view (when viewed from the thickness direction of the positive electrode tab group 23).

When the bonding portion J between the positive electrode tab group 23 and each positive electrode second collecting member 52 has a bonding mark 53, the bonding mark 53 preferably overlap with the arc-shaped wrinkle 27 as shown in FIG. 11. At this time, the length of the width La of the arc-shaped wrinkle 27 is preferably longer than the width Wc of the bonding mark 53 in the long side direction. A region where the arc-shaped wrinkle 27 is formed is relatively hard. Thus, the breakage of the positive electrode tabs 22*t* can be reduced. On the other hand, if the linear wrinkles 28 are formed in each positive electrode tab 22*t*, regions where the linear wrinkles 28 are formed preferably do not overlap with the bonding mark 53.

The negative electrode collecting member 60 constitutes a conductive path which electrically connects between the negative electrode tab group 25 made of multiple negative electrode tabs 24*t* and the negative electrode terminal 40. The configuration of the negative electrode collecting member 60 may be the same as that of the positive electrode collecting member 50. Specifically, as shown in FIGS. 2 and 5, the negative electrode collecting member 60 includes: a negative electrode first collecting member 61 which is a plate-like electroconductive member extending along the inner surface of the sealing plate 14; and multiple negative electrode second collecting members 62 which are plate-like electroconductive members extending along the up-down direction Z. The lower end 40*c* of the negative electrode terminal 40 extends toward inside of the battery case 10 through the terminal outlet 18 of the sealing plate 14, and is connected to the negative electrode first collecting member 61 (see FIG. 2). On the other hand, as shown in FIGS. 4 to 6, the negative electrode second collecting members 62 are connected to the respective negative electrode tab groups 25 of the wound electrode assemblies 20*a*, 20*b*, and 20*c*. The negative electrode first collecting member 61 and the negative electrode second collecting members 62 may be made of the same metal species as the negative electrode substrate 24*c*, for example, an electroconductive metal such as copper, a copper alloy, nickel, and stainless steel. The negative electrode collecting member 60 is an example of the electrode collecting member.

As shown in FIG. 2, the positive electrode insulating member 70 is arranged between the positive electrode first collecting member 51 and the inner surface of the sealing plate 14. The positive electrode insulating member 70 is a member insulating between the sealing plate 14 and the positive electrode first collecting member 51. The positive electrode insulating member 70 is made of a resin material which is resistant to the electrolyte used and has electrical insulation properties and elastically deformable, and the resin material is, for example, preferably a polyolefin resin such as polypropylene (PP), a fluorine resin such as a tetrafluoroethylene-perfluoroalkoxyethylene copolymer (PFA), and polyphenylene sulfide (PPS).

The positive electrode insulating member 70 includes a plate-like base portion 70*a* interposed between the positive electrode first collecting member 51 and the inner surface of the sealing plate 14. This allows reduction in conduction between the positive electrode first collecting member 51 and the sealing plate 14. The positive electrode insulating member 70 includes protrusions 70*b* protruding from the inner surface of the sealing plate 14 toward the wound electrode assemblies 20*a*, 20*b*, and 20*c* constituting the electrode assembly group 20 (see FIGS. 2 and 3). This restricts movement of the wound electrode assemblies 20*a*, 20*b*, and 20*c* in the up-down direction Z, and prevents direct contact between the wound electrode assemblies 20*a*, 20*b*, and 20*c* and the sealing plate 14.

The number of protrusions 70*b* herein is the same as the number of the wound electrode assemblies 20*a*, 20*b*, and 20*c* constituting the electrode assembly group 20. That is, the number of protrusions 70*b* is three. This allows the wound electrode assemblies 20*a*, 20*b*, and 20*c* and the respective protrusions 70*b* to face each other more reliably. The number of protrusions 70*b* may differ from the number of electrode assemblies constituting the electrode assembly group 20, and may be, for example, one.

The negative electrode insulating member 80 is, as shown in FIG. 2, arranged symmetrically with the positive electrode insulating member 70 with respect to the center line CL of the electrode assembly group 20 in the long side direction Y. The configuration of the negative electrode insulating member 80 may be the same as that of the positive electrode insulating member 70. Similarly to the positive electrode insulating member 70, the negative electrode insulating member 80 has a base portion 80*a* arranged between the sealing plate 14 and the negative electrode first collecting member 61 and multiple protrusions 80*b*.

<Method of Manufacturing Electrode Plate>

As described above, in the battery 100 according to the present embodiment, an arc-shaped wrinkle 27 is formed in each of the positive electrode tabs 22*t* and/or the negative electrode tabs 24*t* of the positive electrode plate 22 and/or the negative electrode plate 24. The arc-shaped wrinkle 27 formed allows reduction in bending of the electrode tabs at their tips in the protruding direction Y and unifying of the thickness of the positive electrode tab group 23 and/or the negative electrode tab group 25. Further, the arc-shaped wrinkle 27 formed allows an increase in the bonding strength between the electrode tab group and the electrode collecting member, and formation of stable bonding portion J. The following describes an example of the method of manufacturing an electrode plate including the positive electrode tabs 22*t* and/or the negative electrode tabs 24*t* in each of which the arc-shaped wrinkle 27 as mentioned above is formed. The method of manufacturing the electrode plate according to the present embodiment includes preparing of electrodes, producing of electrode tabs, and forming of arc-shaped wrinkles. The manufacturing method disclosed herein may further include other processes at any stage. The following describes a method of manufacturing a positive electrode plate 22 as an example in detail, the negative electrode plate 24 may be manufactured in the same manner as the manufacturing method.

Figure 12:
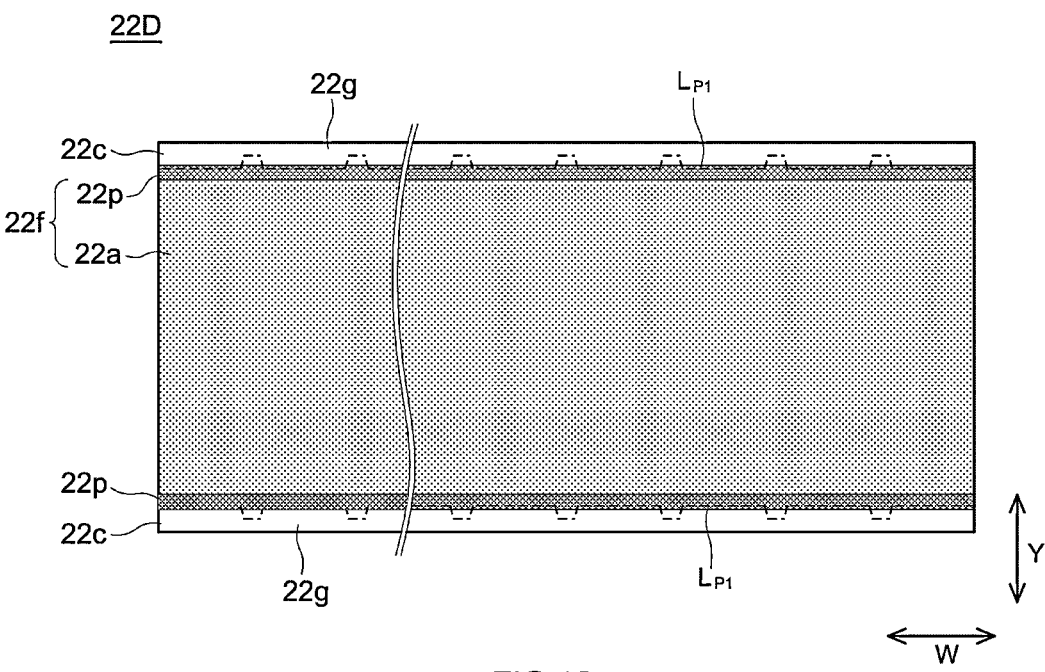
FIG. 12 is a plan view illustrating production of a positive electrode plate according to an embodiment.

In the preparing of electrodes, a positive electrode precursor 22D which is a precursor of the positive electrode plate 22 is prepared. As shown in FIG. 12, the positive electrode precursor 22D includes a positive electrode substrate 22*c* which is a strip-like metal foil. The positive electrode precursor 22D is an example of the electrode precursor. The area of the positive electrode substrate 22*c* of the positive electrode precursor 22D is larger than that of the positive electrode plate 22 (i.e., the positive electrode plate 22 after manufacturing). A positive electrode active material layer 22*a* and a positive electrode protective layer 22*p* are formed on the surface of the positive electrode substrate 22*c*. Note that the positive electrode protective layer 22*p* is not essential, and may be omitted in other embodiments. The positive electrode plate 22 includes, in plan view, a positive electrode active material layer forming region 22*f* where the positive electrode active material layer 22*a* and the positive electrode protective layer 22*p* are formed, and a positive electrode substrate exposing region 22*g* where the positive electrode active material layer 22*a* and the positive electrode protective layer 22*p* are not formed and the positive electrode substrate 22*c* is exposed. The positive electrode active material layer forming region 22*f* is an example of the electrode active material layer forming region. The positive electrode substrate exposing region 22*g* is an example of the electrode substrate exposing region.

A means for preparing the positive electrode precursor 22D with the above-mentioned configuration is not particularly limited, and any of known various means can be employed. For example, a positive electrode paste which is a precursor of the positive electrode active material layer 22*a*, and a protective paste which is a precursor of the positive electrode protective layer 22*p* are applied on surfaces (both surfaces) of the strip-like positive electrode substrate 22*c*, and each paste is then dried. Thus, a positive electrode precursor 22D is produced.

The above-mentioned linear wrinkles 28 are formed in the preparing of electrodes. Specifically, each paste is applied to the positive electrode substrate 22*c*, then dried, and thereafter pressed, thereby forming linear wrinkles 28. The way of the pressing is not particularly limited, and for example, a plate press machine or a roll press machine can be used. The pressing is performed preferably using the roll press machine. Suitable linear wrinkles 28 can be formed near the electrode active material layer forming region by adjusting the press pressure of the roll press machine and the conveying speed.

In the producing of electrode tabs, the positive electrode plate 22 is cut from the positive electrode precursor 22D, thereby producing positive electrode tabs 22*t*. FIG. 12 schematically illustrates production of the positive electrode plate 22. In the producing of electrode tabs, for example, a region of the positive electrode precursor 22D where the positive electrode protective layer 22*p* is applied (protective layer applying region) is preferably cut by using laser. At this time, as shown in the dotted line LP1 in FIG. 12, the laser is scanned along the protruding direction Y of the positive electrode precursor 22D from the positive electrode active material layer forming region 22*f* toward the positive electrode substrate exposing region 22*g*. Then, the laser is scanned for a certain distance along the width direction W of the positive electrode precursor 22D, and then, the laser is again scanned along the protruding direction Y toward the positive electrode active material layer forming region 22*f*. As a result, a portion of the positive electrode substrate exposing region 22*g* is cut out to form protrusions, thereby forming positive electrode tabs 22*t* (see FIG. 8). In addition to the laser cutting, cutting blades, dies, cutters, and the like can be used to cut out the positive electrode plate 22, for example.

According to the finding by the present inventors, the longer the length of each positive electrode tab 22*t* in the width direction W, the more suitable the arc-shaped wrinkle 27 mentioned above can be formed. Thus, the length Wa of each positive electrode tab 22*t* near its base in the width direction is preferably 25 mm or more, and the length Wb of the positive electrode tab 22*t* near its tip is preferably 15 mm or more. The length of the positive electrode tab 22*t* in the protruding direction Y is, for example, preferably 15 mm to 25 mm, more preferably 17 mm to 23 mm. In the producing of electrode tabs, the cutting may be performed so that positive electrode tabs 22*t* each in such a shape are produced.

The positive electrode plate 22 has multiple positive electrode tabs 22t, and the lengths of the positive electrode tabs 22t in the protruding direction Y may differ from each other (see FIG. 8). If the lengths of the positive electrode tabs 22t in the protruding direction Y differ from each other, the differences in length in the protruding direction Y is, for example, preferably within ±10 mm, more preferably within ±5 mm. In the producing of electrode tabs, multiple positive electrode tabs 22t are each cut in such a shape, which facilitates alignment of the tip of the positive electrode tab group 23 produced in the producing of an electrode assembly to be described below.

Figures 13, 14:
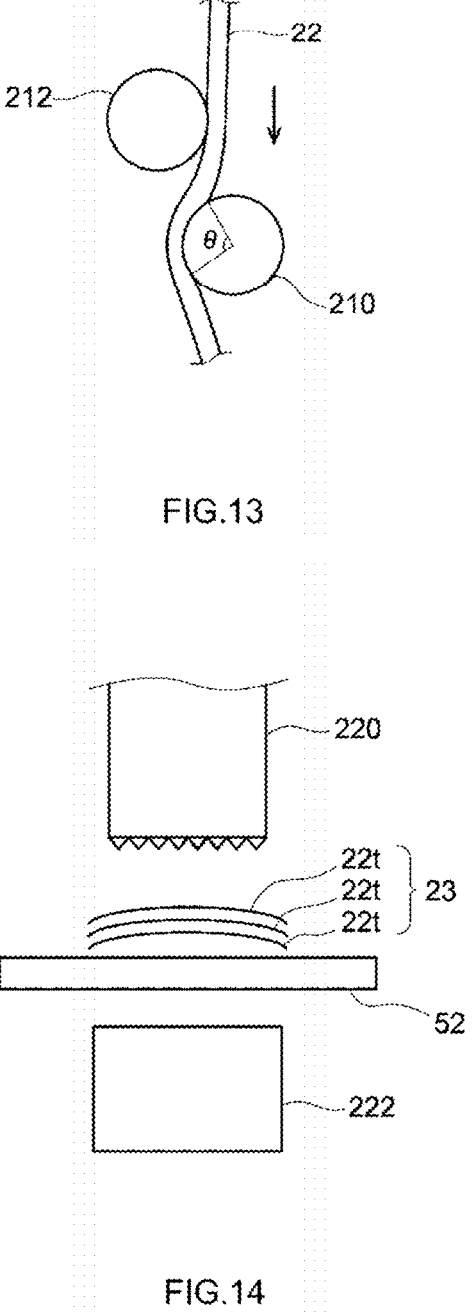
FIG. 13 is a plan view illustrating forming of an arc-shaped wrinkle according to the embodiment.
FIG. 14 is plan view illustrating bonding according to the embodiment.

In the forming of arc-shaped wrinkles, an arc-shaped wrinkle 27 is formed in each of the produced positive electrode tabs 22t. FIG. 13 schematically illustrates the forming of arc-shaped wrinkles. In the forming of arc-shaped wrinkles, the positive electrode plate 22 where the positive electrode tabs 22t are produced is, as shown in FIG. 13, conveyed on a back-up roll 212 along the conveyance direction shown by an arrow, and arc-shaped wrinkles 27 are formed by a forming roll 210. As mentioned above, the arc-shaped wrinkles 27 each preferably have a shape asymmetrical with respect to the width direction W of the positive electrode tabs 22t. The apex P of each arc-shaped wrinkle 27 is located preferably on the tip side rather than on the base side in the protruding direction Y. The arc-shaped wrinkle 27 in such a shape formed in each positive electrode tab 22t allows reduction in breakage of the positive electrode tab 22t when the positive electrode plate 22 is conveyed, for example. Such an arc-shaped wrinkle 27 can be controlled by, for example, appropriately adjusting the shape of each positive electrode tab 22t (the lengths in the width direction W and the protruding direction Y) and the shape of the forming roll 210 (the roll diameter and the warp angle θ). The warp angle θ refers to, as shown in FIG. 13, the angle of arc portion of the forming roll 210 in contact with the positive electrode plate 22.

Although not particularly limited, it is presumed that the arc-shaped wrinkle 27 is formed by the difference in pressure applied from the forming roll 210 between the upstream and downstream sides of the positive electrode tab 22t in the conveyance direction when it contacts the forming roll 210. For example, the smaller the roll diameter of the forming roll 210, more suitably the arc-shaped wrinkle 27 can be formed. The roll diameter of the forming roll 210 is, for example, preferably Φ35 mm or less. Although not particularly limited thereto, the lower limit of the roll diameter of the forming roll 210 is, for example, Φ20 mm or more. In one preferred aspect, the maximum length of each positive electrode tab 22t in the width direction W (here, the length Wa near the base in the width direction) and the roll diameter of the forming roll 210 may be adjusted so that the positive electrode tab 22t does not completely along the outer circumference of the forming roll 210. The arc-shaped wrinkle 27 can be suitably formed, for example, by adjusting the warp angle θ of the forming roll 210 between 105° to 175°. The arc-shaped wrinkle 27 in a desired shape can be formed by using the forming roll 210 such as mentioned above.

The positive electrode tab 22t is preferably formed so as to be curved in the thickness direction X when passing through the back-up roll 212 and the forming roll 210. The positive electrode tab 22t is typically formed in a shape along the outer circumferential surface of the forming roll 210, and curved to be convex toward the back-up roll 212. The positive electrode tab 22t is curved in the thickness direction, which makes it difficult for the positive electrode tab 22t to be broken in the bonding described below and increases the bonding strength. The convex portion of the above-mentioned arc-shaped wrinkle 27 is formed so that the positive electrode tab 22t protrudes in the same direction as the direction in which the positive electrode tab 22t is convexly curved.

According to the method of manufacturing the electrode plate, arc-shaped wrinkles 27 can be suitably formed in the respective electrode tabs. This allows reduction in bending of the electrode tabs at their tips.

<Method of Manufacturing Battery>

The method of manufacturing the battery 100 disclosed herein is characterized in that the electrode plate manufactured by the manufacturing method such as mentioned above includes the positive electrode plate 22 and/or the negative electrode plate 24. The manufacturing processes other than this may be the same as known ones. The battery 100 can be manufactured by providing, besides the positive electrode plate 22 and/or the negative electrode plate 24 such as mentioned above, a separator 26 such as mentioned above, a battery case 10 (an exterior body 12 and a sealing plate 14), an electrolyte, a positive electrode terminal 30, a negative electrode terminal 40, a positive electrode collecting member 50 (a positive electrode first collecting member 51 and a positive electrode second collecting members 52), and a negative electrode collecting member 60 (a negative electrode first collecting member 61 and a negative electrode second collecting members 62) and a manufacturing method including, for example, producing of an electrode assembly, attaching of terminals, bonding, inserting, and sealing in this order. The manufacturing method disclosed herein may further include other processes at any stage.

In producing of an electrode assembly, an electrode assembly including a positive electrode plate 22, a negative electrode plate 24, and a separator 26 is produced. For at least one of the positive electrode plate 22 or the negative electrode plate 24, the electrode plate manufactured by the manufacturing method such as mentioned above is used. In the producing of an electrode assembly, a wound electrode assembly 20a where a strip-like positive electrode plate 22 and a strip-like negative electrode plate 24 are wound via strip-like separators 26 is produced. Specifically, a multi-layer assembly where the separator 26, the negative electrode plate 24, the separator 26, and the positive electrode plate 22 are stacked in this order is produced (see FIG. 7). The multi-layer assembly is then wound so that multiple positive electrode tabs 22t are stacked at positions on one side edge of the multi-layer assembly in the short side direction, and multiple negative electrode tabs 24t are stacked at corresponding positions to the one side edge on the other side edge. Thus, a wound electrode assembly 20a such as shown in FIG. 7 is produced. At this time, when the center portions of the electrode tabs (positive electrode tabs 22t and/or negative electrode tabs 24t) in the width direction W are convexly curved in the thickness direction, the laminate is preferably wound in the same direction as the protruding direction.

In the attaching of terminals, a sealing plate 14, a positive electrode terminal 30, a positive electrode first collecting member 51, a positive electrode insulating member 70, a negative electrode terminal 40, negative electrode first collecting member 61, and negative electrode insulating member 80 are attached. Known production method can be used as the method of producing a first integrated body without particular limitations, and does not limit the technology disclosed herein. Thus, the detailed description thereof is omitted. For example, the positive electrode terminal 30 (or the negative electrode terminal 40), the positive electrode first collecting member 51 (or the negative electrode first collecting member 61), and the positive electrode insulating member 70 (or the negative electrode insulating member 80) may be fixed to the sealing plate 14 by crimping processing (riveting).

In the bonding, as shown in FIG. 4, the positive electrode first collecting member 51 fixed to the sealing plate 14 and the positive electrode second collecting members 52 of the wound electrode assemblies 20a, 20b, and 20c are bonded to each other with the positive electrode tabs 22t curved. For example, ultrasonic bonding (also referred to as ultrasonic welding) can be preferably employed for the bonding between the positive electrode tab group 23 and the positive electrode second collecting member 52.

FIG. 14 schematically illustrates the bonding by ultrasonic bonding. As shown in FIG. 14, sandwiching the positive electrode tab group 23 and the positive electrode second collecting member 52 between a horn 220 and an anvil 222 of an ultrasonic bonding machine is performed. Here, the positive electrode tab group 23 comes into contact with the horn 220, and the positive electrode second collecting member 52 comes into contact with the anvil 222. The horn 220 is then vibrated while the horn 220 is pressed toward the anvil 222, to perform ultrasonic bonding between the positive electrode tab group 23 and the positive electrode second collecting member 52. The ultrasonic bonding can be performed in the same manner as known methods.

The tip of the horn 220 used herein has multiple protrusions. The shape of the tip of the horn 220 is not particularly limited, and may be, for example, a shape where multiple square pyramids are arranged. As mentioned above, a bonding mark 53 is a set of recesses formed by the horn 220 during ultrasonic bonding.

At this time, a portion of each positive electrode tab 22t where the arc-shaped wrinkle 27 is formed may be sandwiched between the horn 220 and the anvil 222. The portion of each positive electrode tab 22t where the arc-shaped wrinkle 27 is formed is relatively hard. Thus, the positive electrode tab 22t is difficult to be broken, and more suitable ultrasonic bonding can be performed. If the center portions of the positive electrode tabs 22t in the width direction W are convexly curved toward the thickness direction X as mentioned above, the positive electrode tabs 22t are stacked so that the directions in which the positive electrode tabs 22t are convexly curved are aligned, and as shown in FIG. 14, bonding is performed with the positive electrode tabs 22t convexly curved toward the horn 220. This allows more stable bonding because the positive electrode tabs 22t are difficult to be broken, thereby increasing the bonding strength of the bonding portion. The ultrasonic bonding may be performed also on the negative electrode plate 24 in the same manner as mentioned above. The ultrasonic bonding is described above as an example of the bonding method between the electrode tab group and the electrode collecting member. However, the bonding method is not particularly limited. For example, welding such as ultrasound welding, resistance welding, and laser welding may be used.

Figure 15:
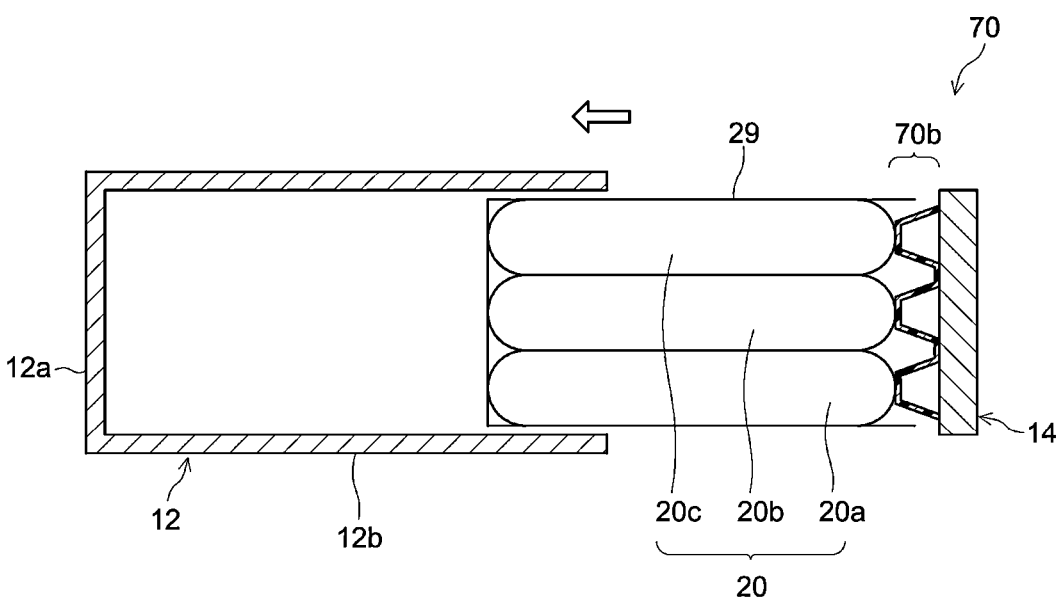
FIG. 15 is a schematic sectional view illustrating inserting of a battery according to the embodiment.

In the inserting, the electrode assembly group 20 integral with the sealing plate 14 is housed in the internal space of the exterior body 12. FIG. 15 is a schematic sectional view illustrating the inserting. Specifically, first, an insulating resin sheet made of a resin material such as polyethylene (PE) is bent into a bag or a boxy shape, thereby preparing an electrode assembly holder 29. Then, an electrode assembly group 20 is housed in the electrode assembly holder 29. Thereafter, the electrode assembly group 20 covered with the electrode assembly holder 29 is inserted into the exterior body 12. If the electrode assembly group 20 is heavy, approximately 1 kg or more, for example, 1.5 kg or more, further 2 kg to 3 kg, the exterior body 12 may be arranged so that the long side wall 12b of the exterior body 12 intersects the direction of gravity (the exterior body 12 is arranged horizontally), and the electrode assembly group 20 may be inserted into the exterior body 12, as shown in FIG. 15.

The curved portions 20r of the wound electrode assemblies 20a, 20b, and 20c constituting the electrode assembly group 20 are pushed by the protrusions 70b of the positive electrode insulating member 70 and/or the protrusions 80b of the negative electrode insulating member 80, and pushed into the exterior body 12. The pushing the electrode assembly group 20 by the protrusions 70b and/or the protrusions 80b into allows reduction in the load on the positive electrode tab group 23 and/or the negative electrode tab group 25, particularly the load on the vicinity of the bases of the positive electrode tabs 22t.

The positive electrode tab group 23 and/or the negative electrode tab group 25 have allowance that allows it to move in a direction intersecting the protruding direction (typically, the up-down direction Z). Therefore, when the exterior body 12 is raised after the electrode assembly group 20 is inserted into the exterior body 12 so that the sealing plate 14 is positioned upward, the electrode assembly group 20 moves slightly downward due to the gravity. Thus, as shown in FIG. 3, the protrusions 70b of the positive electrode insulating member 70 are apart from the wound electrode assemblies 20a, 20b, and 20c. Further, the protrusions 80b of the negative electrode insulating member 80 are apart from the wound electrode assemblies 20a, 20b, and 20c.

In the sealing, the sealing plate 14 is bonded to the edge of the opening 12h of the exterior body 12 to seal the opening 12h. The sealing plate 14 is bonded by, for example, welding such as laser welding. An electrolyte is then injected into a liquid injection hole 15, and the liquid injection hole 15 is closed by the sealing member 16. Thus, a battery 100 is sealed.

In this manner, battery 100 can be manufactured.

The battery 100 can be used for various applications. For example, the battery 100 can be suitably used as a power source (drive power source) for motors in vehicles such as passenger cars and trucks. Although not particularly limited thereto, examples of the types of the vehicles include plug-in hybrid vehicle (PHEV), a hybrid vehicle (HEV), and electric vehicles (BEV). The battery 100 can be suitably used for the construction of an assembled battery.

While some embodiments of the disclosure have been described above, the embodiments are mere examples. The disclosure can be executed in various other embodiments. The disclosure can be executed based on the contents disclosed herein and the technical knowledge in the present field. The technology described is the appended claims include various modifications and changes of the foregoing embodiments. For example, it is possible to replace partially the embodiments with other modifications, and it is also possible to add other modifications to the embodiments. If the technical feature is not described as essential, it can be eliminated, as appropriate.

What is claimed is:

1. A battery comprising:
   a positive electrode plate including a positive electrode substrate and a positive electrode active material layer disposed on the positive electrode substrate; and a negative electrode plate including a negative electrode substrate and a negative electrode active material layer disposed on the negative electrode substrate, wherein at least one of the positive electrode plate or the negative electrode plate has multiple electrode tabs protruding outward from a region of an electrode substrate where an electrode active material layer is not disposed, and the electrode tabs each have an arc-shaped wrinkle, wherein a length of the arc-shaped wrinkle with respect to a width direction, orthogonal to a protruding direction, of the electrode tabs, is shorter than a width of the corresponding electrode tab.

2. The battery according to claim 1, wherein the electrode tabs are stacked and bonded to an electrode collecting member.

3. The battery according to claim 1, wherein the arc-shaped wrinkle is convex toward a tip of the protruding direction of each of the electrode tabs.

4. The battery according to claim 1, wherein the arc-shaped wrinkle has a shape asymmetrical with respect to the width direction orthogonal to the protruding direction of the electrode tabs.

5. The battery according to claim 1, wherein the electrode tabs each have multiple linear wrinkles besides the arc-shaped wrinkle.

6. The battery according to claim 5, wherein the arc-shaped wrinkle and the linear wrinkles do not intersect.

7. The battery according to claim 2, wherein a portion of each of the electrode tabs bonded to the electrode collecting member has the arc-shaped wrinkle.

8. The battery according to claim 2, wherein the electrode tabs have different lengths in the protruding direction and are stacked and bonded to the electrode collecting member.

9. The battery according to claim 2, wherein the electrode tabs are stacked and bonded to the electrode collecting member, and center portions of the electrode tabs in the width direction are concavely curved toward the electrode collecting member.

10. The battery according to claim 1, further comprising a boundary located between the electrode tabs and the electrode substrate, wherein an entirety of the arc-shaped wrinkle is located on a tip of the corresponding electrode tab, wherein the tip protrudes from the boundary located between the electrode tabs and the electrode substrate.

*    *    *    *    *